United States Patent [19]
Cone, II

[11] Patent Number: 5,567,008
[45] Date of Patent: Oct. 22, 1996

[54] PORTABLE INFANT SEAT HAVING A DETACHABLE BASE

[75] Inventor: Richard E. Cone, II, Athens, Ohio

[73] Assignee: Cosco, Inc., Columbus, Ind.

[21] Appl. No.: 334,743

[22] Filed: Nov. 4, 1994

[51] Int. Cl.$^6$ ........................................................ B60N 2/28
[52] U.S. Cl. .................... 297/256.16; 297/183.2
[58] Field of Search ............................ 297/250.1, 256.16, 297/183.2, 130, 183.1, 183.3, 183.6

[56] References Cited

U.S. PATENT DOCUMENTS

| | | |
|---|---|---|
| D. 294,777 | 3/1988 | Wise et al. . |
| D. 305,583 | 1/1990 | Turner et al. . |
| D. 322,001 | 12/1991 | Meeker . |
| D. 325,132 | 4/1992 | Cone . |
| 763,771 | 6/1904 | Lukens et al. . |
| 921,361 | 5/1909 | Chambers, Jr. . |
| 1,167,525 | 1/1916 | Rundle . |
| 2,509,972 | 5/1950 | Gottfried . |
| 2,982,562 | 5/1961 | Gladstein . |
| 3,029,087 | 4/1962 | Alsop . |
| 3,083,997 | 4/1963 | Chreist, Jr. . |
| 3,596,986 | 8/1971 | Ragsdale . |
| 4,306,749 | 12/1981 | Deloustal ............................ 297/256.16 |
| 4,345,791 | 8/1982 | Bryans et al. . |
| 4,371,206 | 2/1983 | Johnson, Jr. . |
| 4,385,769 | 5/1983 | Molino . |
| 4,501,032 | 2/1985 | Heath et al. . |
| 4,545,613 | 10/1985 | Martel et al. .................. 297/256.13 X |
| 4,634,177 | 1/1987 | Meeker . |
| 4,664,396 | 5/1987 | Pietrafesa ................................. 297/130 |
| 4,733,909 | 3/1988 | Single, II et al. . |
| 4,861,105 | 8/1989 | Merten et al. . |
| 4,915,446 | 4/1990 | Darling et al. . |
| 4,943,113 | 7/1990 | Meeker . |
| 4,984,813 | 1/1991 | Takahashi et al. . |
| 4,998,307 | 3/1991 | Cone . |
| 5,052,750 | 10/1991 | Takahashi et al. ............. 297/256.16 X |
| 5,058,283 | 10/1991 | Wise et al. . |
| 5,203,577 | 4/1993 | Kato et al ........................... 297/130 X |
| 5,277,472 | 1/1994 | Freese et al. ........................... 297/130 |
| 5,385,387 | 1/1995 | Kain ............................... 297/256.17 X |

FOREIGN PATENT DOCUMENTS

| | | |
|---|---|---|
| 2227719 | 11/1974 | France . |
| 2379417 | 9/1978 | France . |
| 2407111 | 5/1979 | France . |
| 3626298 | 12/1987 | Germany . |

OTHER PUBLICATIONS

Century Products Company, 590 Infant Car Seat/Carrier, 1993 Owner's Manual, four pages including cover sheet and pp. 1, 6, and 7.

Primary Examiner—Peter R. Brown
Attorney, Agent, or Firm—Barnes & Thornburg

[57] ABSTRACT

A restraining system is provided for a child. The restraining system includes a base mountable to a car seat and an infant carrier including a shell received by the base. A clamp arm engages the shell and couples the shell to the base. The clamp arm is movable to a release position disengaged from the shell. The restraining system further includes a release button mounted to the shell for movement to an activated position engaging and moving the clamp arm to the release position.

52 Claims, 3 Drawing Sheets

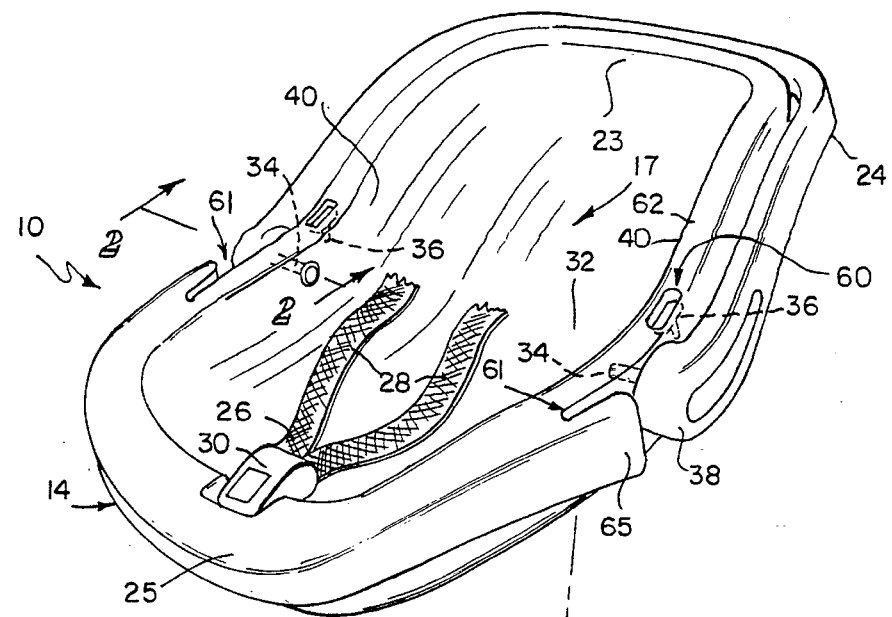

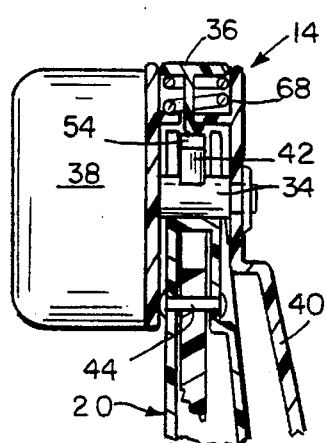
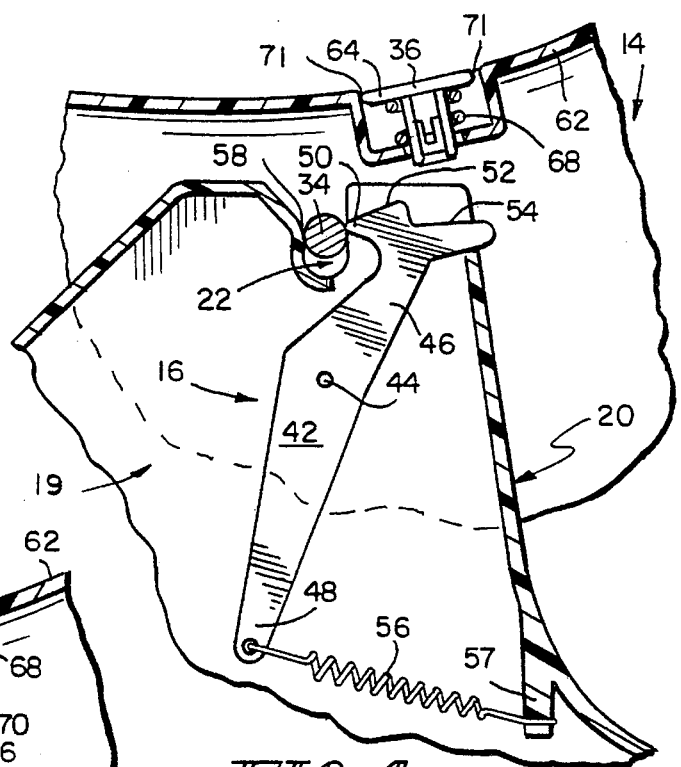
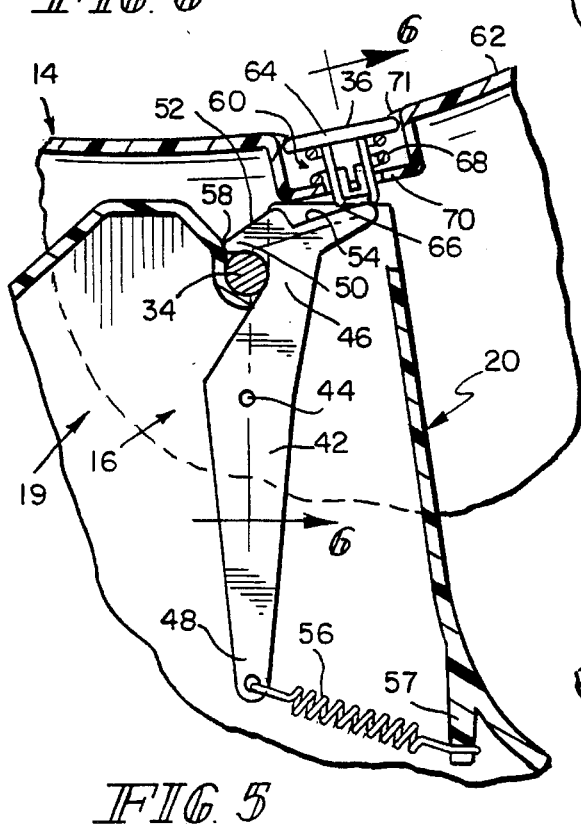
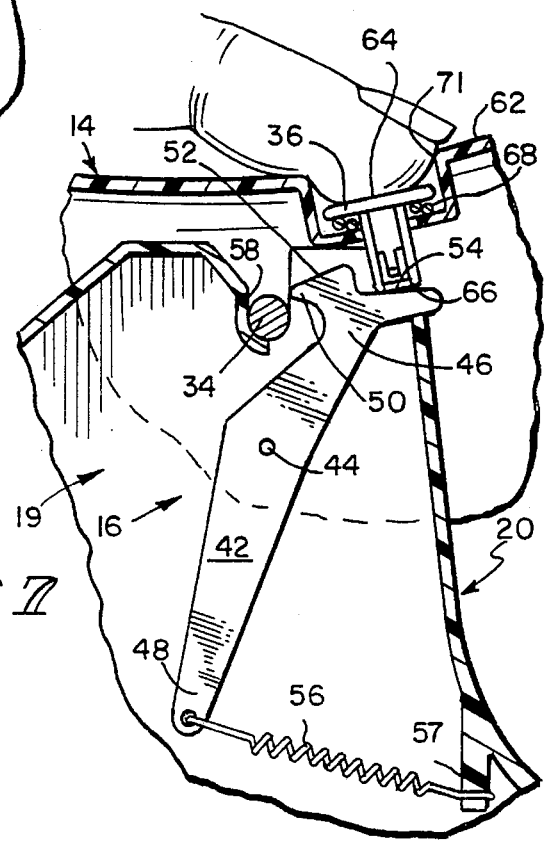

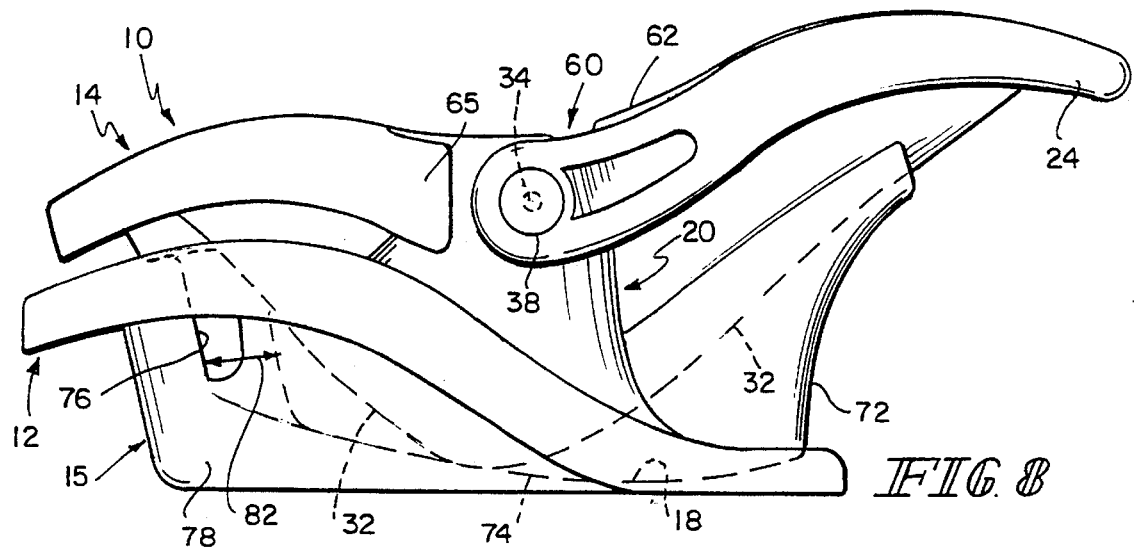
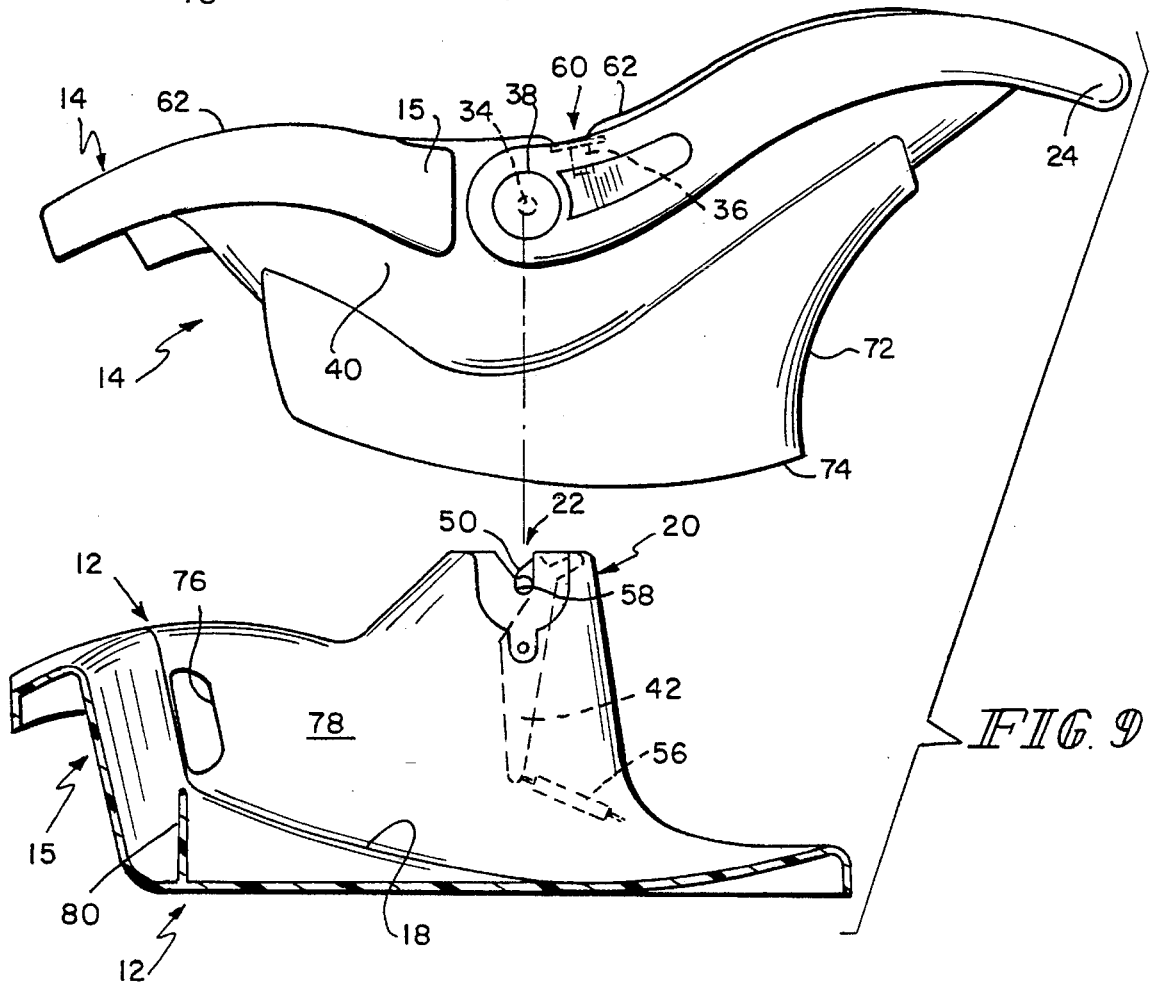

PORTABLE INFANT SEAT HAVING A DETACHABLE BASE

BACKGROUND AND SUMMARY OF THE INVENTION

The present invention relates to a child restraint system, and particularly to a portable infant seat having a detachable base. More particularly, the present invention relates to a portable infant seat that is easily and readily coupled to and uncoupled from a base mountable to the seat of a vehicle such as an automobile.

Infant car seats are widely accepted as a necessary appliance for transporting young children in automobiles or other vehicles. However, car seats are one of an assortment of items including strollers, portable infant carriers, and many other devices suitable for accommodating specific child transport needs. Parents welcome a child transport device that serves multiple purposes, such as an infant car seat that can be used easily to carry children away from the vehicle such as when shopping or performing other activities.

An infant car seat including a portable carrier suitable for use away from a vehicle and a detachable base adapted to be mounted to vehicle seats would be one such multiple purpose device. Infant car seats with detachable bases are known in the art. Techniques for coupling seats to bases include a tongue-and-groove arrangement as disclosed in U.S. Pat. Nos. 4,345,791 to Bryans et al. and 4,733,909 to Single II et. al, a slidable spring-loaded bolt system as disclosed in U.S. Pat. No. 4,634,177 to Meeker, a system including restraining rails to restrict longitudinal motion and stops to restrict vertical motion as disclosed in U.S. Pat. No. 5,277,472 to Freese et al., and a three-point coupling arrangement as disclosed in U.S. Pat. No. 4,943,113 to Meeker.

What is needed is an infant car seat having a detachable base that is convenient to use and that is simple in design. Manufacturers would welcome a device requiring a minimum number of assembly parts to minimize manufacturing costs, while consumers would appreciate an infant carrier that is easy to couple and uncouple from a detachable base while incorporating conveniences typically associated with portable infant carriers. The device of the present invention is designed to satisfy both the manufacturers and the users.

According to the present invention, a restraining system is provided for a child. The restraining system includes a base that is mountable to a car seat and a infant carrier that is formed to be received by the base. The base includes a clamp arm and the infant carrier includes a shell having a mounting site fixed to the shell and positioned to lie in locking engagement with the clamp arm when the infant carrier is fully seated in the base. The infant carrier further includes a release button positioned to engage the clamp arm when the infant carrier is seated in the base. Pressing the release button when the infant carrier is seated on the base causes the clamp arm to disengage from the mounting site, thereby allowing removal of the carrier from the base. When the base is not available, the infant carrier may be mounted directly on the car seat so that the infant faces rearwardly and the carrier held securely by a seat belt in conventional fashion.

In preferred embodiments, the infant carrier includes two mounting sites and the base includes two spring-loaded clamp arms. A mounting post is provided at each mounting site and each clamp arm is arranged to grip one of the mounting posts to hold the infant carrier in a fixed position on the base. Illustratively, the left side of the infant carrier shell includes a first mounting post and a companion release button. The right side of the infant carrier shell includes a second mounting post and another release button. When the infant carrier shell is nested in a mounting position on the underlying base, a left-side spring-loaded clamp arm engages and grips the first mounting post while the right-side spring-loaded clamp arm engages and grips the second mounting post. The release buttons can be operated to disengage the clamp arms from the mounting posts.

To lock the infant carrier to the base, the infant carrier shell is positioned relative to the underlying base such that the two mounting posts contact the two clamp arms. As the infant carrier shell is lowered into the base, the clamp arms, under camming engagement with the mounting posts, are forced back against their biasing springs to mounting post-releasing open positions, allowing the mounting posts to enter slots adjacent to the clamp arms. Illustratively, the base further includes a floor and a pair of spaced-apart upstanding support members rising up from the floor. Each support member is configured to carry one of the spring-loaded clamp arms and to include one of the mounting post-receiving slots. When the infant carrier shell is fully seated in the base, the clamp arms spring back to mounting post-gripping closed positions, trapping the mounting posts in the slots formed in the support members and thus locking the infant carrier shell to the base.

Decoupling of the infant carrier shell from the base requires only that the operator grasp the infant carrier shell with both hands, depress the release buttons which are ergonomically located on left and right side walls of the shell adjacent to the areas, grasped by the operator, and lift the infant carrier shell away from the base. When the spring-loaded release buttons are depressed, the release buttons move relative to the shell to engage the clamp arms and pivot them to the open positions. Once the clamp arms are pivoted and retracted to their open positions, the infant carrier shell can be lifted up and away from the base with no interference from the clamp arms.

The infant carrier and base of the present invention are designed with a minimum number of parts to minimize manufacturing costs while providing a restraining system that is convenient and easy for the operator to use. To further add convenience and encourage use of the restraining system, the infant carrier is formed to include a carrying handle coupled to the shell to facilitate use of the carrier outside of and away from a vehicle. The bottom side of the infant carrier shell is shaped and formed to enable the carrier to be rocked like a cradle when placed on a flat surface to allow for pacifying an infant, and the bottom side of the infant carrier shell is further formed to nest inside of shopping carts.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which:

FIG. 1 is a perspective view of a portable infant seat in accordance with the present invention showing an infant carrier separated from an underlying detachable base and positioned to be coupled to the base and showing a pair of mounting posts (in phantom) attached to the infant carrier and positioned to lie directly above a pair of clamping assemblies attached to the detachable base;

FIG. 2 is a sectional view taken along line 2—2 of FIG. 1 showing one of the mounting posts on the infant carrier as it is to be lowered into engagement with one of the underlying clamping assemblies attached to the detachable base in order to mount the infant carrier securely on the detachable base;

FIGS. 3–5 illustrate in sequence movement of one of the mounting posts on infant carrier into engagement with one of the clamping assemblies attached to the base during installation of the infant carrier on the base;

FIG. 3 is a sectional view of a portion of the infant carrier and detachable base of FIGS. 1 and 2 showing the cylindrical mounting post of FIG. 2 contacting an upwardly facing cam surface provided on a spring-biased pivotable clamp arm included in the clamping assembly of FIG. 2 and pivoting the clamp arm against its biasing spring toward a slot-opening position as the infant carrier is lowered into engagement with the underlying detachable base;

FIG. 4 is a view similar to FIG. 3 showing the mounting post on the infant carrier as it moves downwardly past the pivoted clamp arm into a U-shaped mounting slot formed in the detachable base;

FIG. 5 is a view similar to FIGS. 3 and 4 of the infant carrier in its fully-installed position in the detachable base showing the mounting post fully seated in the U-shaped mounting slot and the clamp arm pivoted back by the biasing spring to a mounting post-gripping position and showing a spring-loaded release button attached to the infant carrier and positioned to engage a flange on the clamp arm;

FIG. 6 is a sectional view similar to FIG. 2 taken along line 6—6 of FIG. 5 showing the release button and underneath the release button showing the gripping engagement of the clamp arm and the mounting post;

FIG. 7 is a view similar to FIG. 5 showing the position of the release button after it has been depressed manually by an operator and moved to a mounting post-releasing position pivoting the clamp arm against its spring to a mounting post-disengaging position to allow a user to lift the mounting post out of the U-shaped mounting slot without interference from the clamp arm during removal of the infant carrier from the underlying detachable base;

FIG. 8 is a side elevation view of the infant car seat of FIG. 1 showing the infant carrier fully installed in the base and showing (in phantom) a curved floor inside the infant carrier, a gently-curving external bottom wall on infant carrier, and a contoured infant carrier-receiving floor inside the detachable base; and FIG. 9 is an exploded view of the infant carrier and the detachable base of FIG. 8 following removal of the infant carrier from the base with the infant carrier shown in full elevation and the detachable base shown in a transverse sectional view and showing (in phantom) one of the clamp arms and clamp arm-biasing springs in the detachable base and one of the mounting posts and release buttons in the infant carrier and showing the contoured infant carrier-receiving floor in the detachable base.

DETAILED DESCRIPTION OF THE DRAWINGS

As shown in FIG. 1, infant car seat 10 includes a detachable base 12 and an infant carrier 14. Infant carrier 14 is removable from the base 12 so that it can be used by itself to transport an infant or child (not shown) easily. For example, the base 12 can be fixed in place on an automobile seat or the like and arranged to receive and support infant carrier 14. The infant carrier 14 can be mounted on the fixed detachable base 12 while the infant is traveling in the automobile and then can be removed from the base 12 and used by itself to transport the infant to and from the automobile or any other destination. Additionally, the infant carrier 14 can be mounted directly on an automobile seat or the like while the infant is traveling in the automobile to permit travel in a vehicle with the infant when the base 12 is not conveniently accessible. When the infant carrier 14 is mounted directly to an automobile seat, the carrier 14 is positioned so that the infant faces rearwardly when held in the carrier 14.

Infant carrier 14 includes a head end 23, a foot end 25, and two longitudinally extending side walls 40 therebetween as shown best in FIG. 1. Infant carrier 14 is formed to include infant seat 17 sized and shaped to receive an infant therein. The infant carrier 14 is also formed to include a top wall 62 approximately perpendicular to the side walls 40 and extending along the entire circumference of the carrier 14. A downwardly extending lip 63 is integrally appended to the top wall 62 along the circumference of the top wall 62 to form a downwardly facing U-shaped channel 33 around the carrier 14.

A pivotable U-shaped handle 24 is coupled to the side walls 40 of the infant carrier 14 to facilitate transport of the portable infant car seat 10. The handle 24 is coupled to a hub-receiving platform 41 by two rotatable hubs 38 as shown best in FIG. 2. The hub-receiving platform 41 is integrally appended to the lip 63. The hubs 38 are mounted to opposing sides of the infant carrier 14 approximately half-way between the head end 23 and the foot end 25. The hubs 38 include hub covers 39 that are integrally appended to the terminal ends of the handle 24. Each hub cover 39 is rotatably mounted to the hub-receiving platform 41 by a rivet 37 that is coincident with the axis of rotation of the hub 38. The rivet 38 additional supports a mounting post 34 located inside of the channel 33 and adjacent both to the hub-receiving platform 41 and to the side wall 40. The mounting post 34 provides support to maintain the spaced-apart relation of the side wall 40 and the lip 63.

The top wall 62 is formed to include wings 65 adjacent to the hubs 38 as shown best in FIG. 1. The wings 65 are formed by increasing the width of the top wall 62 adjacent to the hubs 38 on the portion of the top wall 62 toward the foot end 25 of the carrier 14. The hubs 38 are freely rotatable from a position in which the handle 24 is approximately flush with the head end 23 of the carrier 14 as shown in FIG. 1 upwards through an arc of approximately 120 degrees to a position at which the handle 24 engages the wings 65.

The top wall 62 of the carrier 14 is formed to further includes slots 61 between the wings 65 and the side walls 40. The slots 61 are sized to receive a conventional vehicle seat belt (not shown) so that the carrier 14 can be mounted directly to the seat of a vehicle (not shown), independent of the base 12. The seat belt is passed through the slots 61 and across the top of the carrier 14 when the carrier 14 is mounted directly to the seat of a vehicle without using base 12. The carrier 14 is configured to face rearwardly when it is mounted directly to the seat of a vehicle.

A harness 26 is provided to restrain an infant seated in infant seat 17. Harness 26 includes two shoulder straps 28 joined together by a buckle 30 and a crotch strap (not shown) carrying a tongue (not shown) that is connectable to buckle 30 and is attached to the floor 32 of the carrier 14. The harness 26 can be used to restrain a child seated in infant carrier 14 and buckle 30 can be disengaged to release the child therefrom.

Base 12 includes a shell 15 that is hollowed out to receive infant carrier 14 and a pair of upright support members 20 arranged to lie in spaced-apart parallel relation on opposite sides of shell 15. One clamping assembly 16 is mounted on each of the upright support members 20 and configured to grip one of the mounting posts attached to infant carrier 14. A support member 20 and clamping assembly 16 is illustrated in FIGS. 3–7. Though there are two clamping assemblies and two mounting posts, FIGS. 3–7 will be used in connection with the description below of one of those sets of mounting posts and clamping assemblies, though this description applies to both mounting post and clamping assembly sets.

Each support member 20 is integrally appended to a contoured shell-receiving floor 18 formed in the base 12 and includes a hollow interior portion 19 defined by the interior surface 21 of the support member 20 as shown in FIGS. 1—3. Each clamping assembly 16 includes an elongated clamp arm 42 mounted inside the hollow interior portion 19 of support member 20. The clamp arm 42 extends across the width of the interior portion 19 adjacent to mounting post-receiving slot 22 formed in the support member 20. The clamp arm 42 is pivotally connected to the support member 20 by a pivot pin 44 positioned approximately midway along the length of the clamp arm 42 as shown, for example, in FIG. 3. The pivot pin 44 extends laterally across the width of the clamp arm 42 and through the two opposing walls of the support member 20 as shown in FIG. 2.

Each clamp arm 42 includes an upper end 46 and a lower end 48. The upper end 46 includes a hook 50, a first cam surface 52, and a second cam surface 54. The hook 50 faces toward the foot end 13 of the base 12 and is sized to partially encircle its companion mounting post 34 when the carrier 14 is fully seated in the base 12 as shown in FIG. 5. The hook 50 and the pivot pin 44 are positioned relative to a companion mounting post-receiving slot 22 so that the hook 50 will trap the mounting post 34 securely when the carrier 14 is fully seated in the base 12 and each mounting post 34 is fully seated in its companion slot 22. It will be understood that this clamping at the mounting post 34 by the hook 50 traps the mounting post 34 and positively restrains the mounting post 34 from both horizontal and vertical movement relative to the hook 50, thus also restraining the infant carrier 14 from both horizontal and vertical movement relative to the base 12.

The first cam surface 52 is positioned to lie adjacent to the top of the hook 50. The first cam surface 52 is arranged relative to the pivot pin 44 and the mounting post 34 so that the clamp arm 42 will pivot in a clockwise direction 55 when the first cam surface 52 is subjected to a contacting force, such as when the mounting post 34 contacts the first cam surface 52 as the carrier 14 is seated into the base 12, as shown in FIG. 3. The second cam surface 54 is disposed adjacent to the first cam surface 52 and is arranged relative to the pivot pin 44 so that the clamp arm 42 will pivot in a clockwise direction 55 when the second cam surface 54 is subjected to a contacting force (generated, for example, by a manually operated release button 36).

Each clamping assembly 16 further includes a spring 56 that is attached to the lower end 48 of the clamp arm 42. The spring 56 is also attached to a spring-support post 57 that is integrally appended to the interior surface 21 of the support member 20. The spring-support post 57 is located on the side of the support member 20 closest to the head end 11 of the base 12 so that the spring 56 biases the clamp arm 42 in a counterclockwise direction to a closed position with the hook 50 resting against a side wall 58 of the mounting post-receiving slot 22 as shown in FIG. 9.

To lock the infant carrier 14 to the base 12, a person holding the infant carrier 14 positions it over the floor 18 on base 12 so that the two spaced-apart mounting posts 34 contact the two spaced-apart underlying clamping assemblies 16 provided in the spaced-apart support members 20. As the infant carrier 14 is lowered along the dotted line path shown in FIG. 1 toward an installed position lying within a hollowed cavity 17 formed in base 12, the clamping assemblies 16 are moved to a mounting post-receiving open position allowing the mounting posts 34 to enter mounting post-receiving slots 22 formed in the upright support members 20. When carrier 14 is fully installed in the base 12, the clamping assemblies 16 function to trap the mounting posts 34 in the slots 22 thus locking infant carrier 14 to base 12. Though the mounting posts 34 also provide structural support to the hubs 38, it can now be understood that the pivotable carrying handle 24 operates independently of the clamping assemblies 16 and may be moved to any position relative to the infant carrier during locking and unlocking of the infant carrier 14 to and from the base 12.

As the infant carrier 14 is lowered into the base 12, the mounting posts 34 contact the first cam surfaces 52 on the leading edges of the clamp arms 42. As illustrated in FIG. 3, the camming engagement of the mounting post 34 to the first cam surface 52 forces the clamp arm 42 to pivot in a clockwise direction 55 against the tension spring 56. As the infant carrier 14 is lowered into the base 12, the camming engagement of the mounting post 34 and the clamp arm 42 causes the clamp arm 42 to pivot to an open position as shown in FIG. 4. Continued lowering of the infant carrier 14 places the infant carrier 14 in a fully-installed position within the base 12 as shown in FIG. 8. Once the infant carrier 14 is fully installed and the mounting post 34 has advanced past the hook 50, the clamp arm 42 springs back to the closed position trapping the mounting post 34 in the slot 22 and locking the infant carrier 14 to the base 12 as shown in FIGS. 5 and 6.

Two spring-loaded release buttons 36 are positioned in depressions 60 formed in the top wall 62 provided along the circumference of the carrier 14. Each depression 60 is positioned to lie near a hub 38 and toward the head end 23 of the carrier 14 as shown in FIG. 1. Each depression 60 includes a bottom wall 70 and a lip 71 extending inwardly from the top wall 62 surrounding the depression 60. The release buttons 36 include a top wall 64 sized to fit inside of the depression 60 and to rest against the lip 71 when the release buttons 36 are in closed positions as shown in FIGS. 5 and 6.

The release buttons 36 also include a bottom end 66 positioned to contact the second cam surface 54 of the clamp arm 42 when the infant carrier 14 is fully seated in the base 12 and the clamp arm 42 is in the closed position as shown in FIGS. 5 and 6. Compression springs 68 yieldably urge the release buttons 36 to the closed position in which the top walls 64 of the release buttons 36 rest against the lip 71 and lie essentially flush with the top wall 62 of the carrier 14. The springs 68 are positioned inside of the depressions 60 and yieldably urge the top walls 64 of release buttons 36 away from the bottom walls 70 of the depressions 60.

To remove the infant carrier 14 from the base 12, the operator grasps both opposing carrier side walls 40 and depresses both release buttons 36 as shown in FIG. 7. Camming engagement of the bottom ends 66 of the release buttons 36 and the second cam surfaces 54 of the clamp arms 42 pivots the clamp arms 42 against the tension springs 56 in a clockwise direction 55 to open positions. Once the clamp arms 42 are in the open positions, the operator simply lifts the infant carrier 14 from the base 12. The ease of locking and unlocking the infant carrier 14 from the base 12, requiring only lowering the infant carrier 14 onto the base 12 to lock and only depressing the release buttons 36 and lifting the infant carrier 14 from the base 12 to unlock is an important advantage of this restraining system. This added convenience makes it easy for owners to use this one appliance to both carry infants in moving automobiles and carry infants while away from automobiles.

Additional convenience is achieved through the shape of the infant carrier 14 and the mating shape of the base 12 as shown in FIGS. 8 and 9. The infant carrier 14 includes a shell 72 appended to the bottom side of the floor 32 of the infant carrier 14. The carrier shell 72 is sized to fit into a shopping cart (not shown) adding to the convenience of transporting an infant with the restraining system of the present invention. The bottom surface 74 of the shell 72 is contoured so that when the infant carrier 14 is separated from the base 12 and placed on a flat surface, the infant carrier 14 can be rocked to pacify an infant held within the infant carrier 14. The top surface 18 of the base 12 is likewise contoured so that the infant carrier 14 is securely held when the infant carrier 14 is seated in the base 12. The base further includes a structural support wall 80 to provide additional strength to the base 12.

The base 12 is configured to be mountable to the seat of a vehicle (not shown). A seat belt (not shown) holds the base 12 to the seat. The belt is passed through apertures 76 in the side walls 78 of the base 12. The shell 72 of the infant carrier 14 is offset by a specified distance 82 to provide clearance for the seat belt as shown in FIG. 8.

Although the invention has been described in detail with reference to a preferred embodiment, variations and modifications exist within the scope and spirit of the invention as described and defined in the following claims.

I claim:

1. A restraining system for a child comprising a base including a base shell, an infant carrier including a shell formed to be received by the base, the shell formed to include a mounting site, and a clamp arm pivotably mounted and located within the base shell and positioned to engage the mounting site, the clamp arm being arranged to limit both vertical and horizontal movement of the mounting site relative to the clamp arm when the mounting site is engaged by the clamp arm, the clamp arm being provided with a release surface located within the base shell adjacent the mounting site and adapted to be actuated by a user to pivot the clamp arm to release the mounting site.

2. The restraining system of claim 1, wherein the clamp arm includes an upper end and a lower end, the upper end being arranged to engage the mounting site, and the restraining system further including a spring appended to the lower end, the spring arranged to bias the clamp arm to engage the mounting site.

3. The restraining system of claim 2, wherein the upper end includes a hook arranged to engage the mounting site, a first cam surface adjacent to the hook and operable to pivot the clamp arm to receive the mounting site when the mounting site exerts a contact force thereon, and wherein the release surface lies adjacent to the first cam surface.

4. The restraining system of claim 1, wherein the shell is formed to include sides and the infant carrier further includes a top wall appended to the sides and a lip appended to the top wall, and the lips, the top wall, and the sides are arranged to form an inverted U-shaped channel, the mounting site being disposed within the channel.

5. The restraining system of claim 4, wherein the mounting site includes a mounting post appended to the lip and to the sides.

6. The restraining system of claim 5, wherein the clamp arm includes a cam surface arranged to move the clamp arm to an open position when the cam surface is subjected to a contact force and the mounting post is positioned to engage the cam surface and exert the contact force on the cam surface as the infant carrier is seated into the base.

7. The restraining system of claim 1, wherein the mounting site is a first mounting post appended to the shell.

8. A restraining system for a child comprising a base formed to include side walls and an upright support member spaced apart from the side walls 11s, an infant carrier including a shell formed to be received by the base, the shell being formed to include a mounting site, a clamp arm pivotably mounted to the upright support member and engaging the mounting site when the shell is received by the base to couple the shell to the base, and a release button appended to the shell adjacent the mounting site, the release button being movable to a position engaging the clamp arm to disengage the clamp arm from the mounting site.

9. The restraining system of claim 8, wherein the shell is formed to include a perimeter, the infant carrier further includes a top wall appended to the perimeter, and the release button is positioned to lie within the top wall.

10. The restraining system of claim 9, wherein the release button includes a top end and a bottom end and the bottom end is arranged to engage the clamp arm to disengage the clamp arm from the mounting site when the release button is activated.

11. The restraining system of claim 9, wherein the release button includes a top end and a bottom end and the bottom end is arranged to engage the clamp arm to disengage the clamp arm from the mounting site when the release button is activated.

12. The restraining system of claim 11, wherein the mounting site engages a first cam surface of the clamp arm when the shell is received by the base to exert a contact force pivoting the clamp arm to receive the mounting site and the bottom end of the release button engages a second cam surface adjacent to the first cam surface to exert a contact force pivoting the clamp arm to disengage the clamp arm from the mounting site when the release button is activated.

13. A restraining system for a child comprising a base, means for clamping movably mounted to said base, an infant carrier including a shell formed to be received by the base, a handle for carrying the infant carrier, and a mounting post coupling the handle to the shell, the mounting post being clamped by the means for clamping when the infant carrier is seated in the base to limit all vertical and horizontal movement of the mounting post relative to the base.

14. The restraining system of claim 13, wherein the shell is formed to include sides and the infant carrier further includes a top wall appended to the sides and a lip appended to the top walls and the lip, the top wall, and the sides are arranged to form an inverted U-shaped channel, the mounting post being disposed within the channel.

15. The restraining system of claim 13, wherein the means for clamping includes a first cam surface arranged to move the means for clamping to an open position when the first cam surface is subjected to a contact force, and the mounting post is arranged to contact the first cam surface and exert the contact force as the infant carrier is received by the base.

16. The restraining system of claim 13, wherein the means for clamping includes a clamp arm mounted to the base and positioned to engage the mounting post.

17. The restraining system of claim 16, wherein the base includes a support member formed to enclose the clamp arm, the clamp arm is pivotally connected to the support member, the clamp arm includes an upper end and a lower end, the upper end being arranged to engage the mounting post, and the restraining system further includes a spring appended to the lower end, the spring arranged to bias the clamp arm to a mounting post-engaging position.

18. The restraining system of claim 17, wherein the upper end includes a hook arranged to engage the mounting post, a first cam surface adjacent to the hook and inclined at a first angle relative to the hook, the first cam surface being contactable by the post to pivot the clamp arm to a position away from the mounting post-engaging position, and a second cam surface adjacent to the first cam surface and inclined at a second angle relative to the hook, the second cam surface adapted to be contacted by a user to pivot the clamp arm to a position away from the mounting post-engaging position.

19. A restraining system for a child comprising a base including means for clamping, an infant carrier including a shell formed to be received by the base, a mounting post appended to the shell, the mounting post being clamped by the means for clamping when the infant carrier is seated in the base to limit all vertical and horizonal movement of the mounting post relative to the base, and a release button is appended to the shell adjacent the mounting post for movement between a position away from the means for clamping and an actuated position toward the means for clamping and unclamping the means for clamping from the mounting post when the release button is actuated.

20. The restraining system of claim 18, wherein the shell is formed to include a perimeter, the infant carrier further includes a top wall appended to the perimeter, and the release button is positioned to lie within the top wall.

21. The restraining system of claim 20, wherein the release button includes a top and a bottom and the bottom engages the means for clamping when the release button is in an open position and the infant carrier is seated in the base.

22. A restraining system for a child comprising a base, an infant carrier including a shell formed to be received by the base, holding means for coupling and uncoupling the carrier and the base to limit the vertical and horizontal movement of the infant carrier relative to the base when the infant carrier is seated in the base, the holding means being pivotably mounted to the base, and a release button coupled to the shell adjacent the holding means for movement between a closed position and an activated position and operative to cause the holding means to uncouple the carrier from the base when the release button is in the activated position so that the infant carrier can be removed from the base.

23. The restraining system of claim 22, wherein the release button includes a top and a bottom and the bottom engages the holding means when the release button is in the open position and the infant carrier is seated in the base.

24. The restraining system of claim 22, wherein the holding means includes a clamp arm mounted to the base and positioned to engage a mounting site appended to the shell.

25. The restraining system of claim 24, wherein the base includes a support member formed to enclose the clamp arm, the clamp arm is pivotally connected to the support member, the clamp arm includes an upper end and a lower end, the upper end being arranged to engage the mounting site, and the restraining system further includes a spring appended to the lower end, the spring arranged to bias the clamp arm to a mounting site-engaging position.

26. The restraining system of claim 25, wherein the upper end includes a hook arranged to engage the mounting site, a first cam surface adjacent to the hook and inclined at a first angle relative to the hook, the first cam surface being contactable by the mounting site to pivot the clamp arm to a position away from the mounting site-engaging position, and a second cam surface adjacent to the first cam surface and inclined at a second angle relative to the hook, the second cam surface adapted to be contacted by a user to pivot the clamp arm to a position away from the mounting site-engaging position.

27. The restraining system of claim 21, wherein the shell is formed to include sides and the infant carrier further includes a top wall appended to the sides and a lip appended to the top wall, and the lip, the top wall, and the sides are arranged to form an inverted U-shaped channel, and a mounting site arranged to engage the holding means is disposed within the channel.

28. The restraining system of claim 27, wherein the mounting site includes a mounting post appended to the lip and to the sides.

29. The restraining system of claim 27, wherein the holding means includes a cam surface arranged to move the holding means to an open position when the cam surface is subjected to a contact force and the mounting post is positioned to engage the cam surface and exert a contact force on the cam surface as the infant carrier is seated into the base.

30. A restraining system for a child comprising a base, an infant carrier including a shell formed to be received by the base, holding means for engaging the carrier and the base to limit the vertical and horizontal movement of the infant carrier relative to the base when the infant carrier is seated in the base, the holding means being interposed between the infant carrier and the base, and a release button arranged adjacent the holding means to disengage the holding means when the release button is in an open position so that the infant carrier can be removed from the base, the release button being mounted to the infant carrier.

31. The restraining system of claim 30, wherein the shell is formed to include a perimeter, the infant carrier further includes a top wall appended to the perimeter, and the release button is positioned to lie within the top wall.

32. The restraining system of claim 31, wherein the release button includes a top and a bottom and the bottom engages the holding means when the release button is in the open position and the infant carrier is seated in the base.

33. A restraining system for a child comprising a base, an infant carrier including a shell formed to be received by the base, clamping means for limiting the vertical and horizontal movement of the infant carrier relative to the base when the infant carrier is seated in the base and the clamping means engages the shell, the clamping means being pivotably mounted to the base, and release means coupled to the shell adjacent the clamping means for permitting, vertical movement of the infant carrier relative to the base when the infant carrier is seated in the base and the release means engages the clamping means.

34. The restraining system of claim 33, wherein the release means engages the clamping means when the infant carrier is seated in the base and the release means is activated.

35. The restraining system of claim 34, wherein the clamp means pivots about a pivot axis between a clamped position engaging the infant carrier to limit the vertical and horizontal movement of the infant carrier relative to the base and an open position allowing movement of the infant carrier relative to the base, the clamp means including a cam surface positioned to lie above the pivot axis, the cam surface being manually operable to pivot the clamping means to the open position.

36. A restraining system for a child comprising a base including two opposed clamping assemblies, a infant carrier including a shell formed to be received by the base, two mounting posts fixed to the shell, each mounting post being positioned to be received by one of the clamping assemblies, each mounting post positioned to be in locking engagement with the respective clamping assembly when the infant carrier is fully seated in the base, two support members appended to the base, each support member being formed to enclose one of the clamping assemblies, each clamping assembly including a clamp arm pivotally connected to the support member, the clamp arm being biased to a closed position, a first cam surface appended to each clamp arm and positioned to contact the mounting post as the infant carrier is positioned to be seated in the base, the cam surface arranged so that the clamp arm pivots to an open position as the mounting post is lowered into the mounting post-receiving recess and engages the first cam surface to exert a first contact force thereon when the infant carrier is lowered onto the base, and a second cam surface appended to each clamp arm adjacent to the first cam surface and manually contactable by an operator so that the clamp arm pivots to an open position when the second cam surface is subjected to a second contact force.

37. The restraining system of claim 36, further comprising two buttons coupled to the shell and biased to a clamp arm-closed position, the buttons positioned to exert the second contact force on the second cam surfaces when the buttons are in a clamp arm-opening position and the infant carrier is seated in the base.

38. A restraining system for a child comprising a base, an infant carrier including a shell received by the base, a clamp arm movably mounted to the base and engaging the shell at a place of engagement to couple the shell to the base when the clamp arm is in a first position, the clamp arm being movable to a release position disengaged from the shell, and a release button mounted to the shell adjacent the place of engagement for movement to an activated position engaging and moving the clamp arm to the release position.

39. The restraining system of claim 38, further comprising a second clamp arm engaging the shell and coupling the shell to the base, the second clamp arm being movable to a release position disengaged from the shell, and a second release button mounted to the shell for movement to an activated position moving the clamp arm to the release position.

40. The restraining system of claim 39, wherein the shell includes two longitudinally extending side walls and the first release button is mounted to the first side wall and the second release button is mounted to the second side wall.

41. The restraining system for claim 39, wherein the shell has a head end and a foot end and further comprising a U-shaped handle having two hubs coupled to the shell approximately half-way between the head end and the foot end, the first and second release buttons being positioned to lie between the two hubs and the head end.

42. The restraining system of claim 38, wherein the base is formed to include an upright support member and the release button is positioned to lie above the support member when the shell is retained by the base.

43. A restraining system for a child comprising base, an infant carrier including a shell received by the base, and a clamp arm mounted to the base for pivoting movement about a pivot axis between a trapping position engaging the infant carrier and locking the infant carrier to the base and an open position unlocking the infant carrier from the base, the clamp arm having a hook positioned above the pivot axis, a first cam surface adjacent the hook and contactable by the carrier to move the clamp arm to the open position, and a second cam surface positioned to lie above the pivot axis and adapted to be contacted by a user to cause the clamp arm to move to the open position.

44. The restraining system of claim 43, further comprising a spring having a first end attached to the base and a second end attached to the clamp arm beneath the pivot axis.

45. The restraining system of claim 43, wherein the base is formed to include an upstanding support member having spaced-apart side walls and the clamp arm is received between the side walls and enclosed therebetween, the side walls having tops and the first and second cam surfaces being positioned beneath a horizontal plane defined by the tops of the side walls.

46. The restraining system of claim 43, wherein the first cam surface is inclined at a first angle relative to the hook and the second cam surface is inclined at a second angle relative to the hook.

47. The restraining system of claim 43, further comprising a release button mounted to the shell and movable to an actuated position engaging the second cam surface and pivoting the clamp arm to the open position.

48. A restraining system for a child comprising a base, an infant carrier including a shell received by the base, a spring having a first end coupled to the base, and a clamp arm mounted to the base for pivoting movement about a pivot axis between a locked position engaging the shell and coupling the shell to the base and an unlocked position releasing the shell from the base, the spring having a second end attached to the clamp arm to yieldably bias the clamp arm to the locked position, the second end being spaced apart from the pivot axis, and the clamp arm including a cam surface that is adapted to be actuated by an operator to pivot the clamp arm to the unlocked position to release the carrier from the base, the cam surface being spaced apart from the second end of the spring and the pivot axis being positioned to lie therebetween.

49. The restraining system of claim 48, wherein the spring is positioned to lie beneath the pivot axis and the cam surface is positioned to lie above the pivot axis.

50. The restraining system of claim 48, wherein the shell includes a post, the clamp arm engages the post when the clamp arm is in the locked position coupling the shell to the base, and the clamp arm further includes a second cam surface, the post engaging the second cam surface and exerting a contact force thereon when the shell is lowered into the base to pivot the clamp arm to the unlocked position.

51. The restraining system of claim 50, wherein the second cam surface is spaced apart from the second end of the spring ad the pivot axis is positioned to lie therebetween.

52. The restraining system of claim 48, further comprising a release button coupled to the shell for movement to an actuated position engaging the cam surface to pivot the clamp arm to the unlocked position.

* * * * *